United States Patent
Simsek et al.

(10) Patent No.: US 9,602,759 B2
(45) Date of Patent: Mar. 21, 2017

(54) DIGITAL BROADCAST RECEIVING DEVICE HAVING AN ELECTRONIC PROGRAM GUIDE

(75) Inventors: Berna Simsek, Istanbul (TR); Koray Atalay, Istanbul (TR); Mehmet Inanc Bilgin, Istanbul (TR)

(73) Assignee: ARCELIK ANONIM SIRKETI, Istanbul (TR)

( * ) Notice: Subject to any disclaimer, the term of this patent is extended or adjusted under 35 U.S.C. 154(b) by 235 days.

(21) Appl. No.: 13/520,174

(22) PCT Filed: Dec. 23, 2010

(86) PCT No.: PCT/EP2010/070632
§ 371 (c)(1),
(2), (4) Date: Aug. 28, 2012

(87) PCT Pub. No.: WO2011/080212
PCT Pub. Date: Jul. 7, 2011

(65) Prior Publication Data
US 2013/0024892 A1    Jan. 24, 2013

(30) Foreign Application Priority Data
Dec. 31, 2009   (TR) .............................. A 2009/10105

(51) Int. Cl.
*H04N 5/445* (2011.01)
*H04N 21/45* (2011.01)

(52) U.S. Cl.
CPC ..... *H04N 5/44543* (2013.01); *H04N 21/4532* (2013.01)

(58) Field of Classification Search
USPC ....................................................... 725/39, 40
See application file for complete search history.

(56) References Cited

U.S. PATENT DOCUMENTS

| | | | | |
|---|---|---|---|---|
| 5,353,121 A | * | 10/1994 | Young et al. | ................... 725/52 |
| 5,652,613 A | | 7/1997 | Lazarus et al. | |
| 6,271,893 B1 | * | 8/2001 | Kawaguchi et al. | ......... 348/725 |
| 2002/0057336 A1 | * | 5/2002 | Gaul et al. | ...................... 348/47 |
| 2008/0229359 A1 | * | 9/2008 | Robinson | ........... H04N 5/44543 725/46 |
| 2009/0125945 A1 | * | 5/2009 | Lee | ........................ H04N 7/163 725/46 |

FOREIGN PATENT DOCUMENTS

| | | |
|---|---|---|
| JP | 9070020 A | 3/1997 |
| JP | 4332225 B2 | 9/2009 |
| WO | 9641470 A1 | 12/1996 |

* cited by examiner

*Primary Examiner* — Michael Hong
(74) *Attorney, Agent, or Firm* — Kilpatrick Townsend & Stockton LLP

(57) ABSTRACT

The present invention relates to a digital broadcast receiving device (1) comprising at least one receiving means (2) which provides the EPG data to be received, at least one storage means (3) which provides the EPG data to be stored, at least one transmitting means (4) which transmits data to a screen (E) such that the EPG data are able to be viewed by the user.

9 Claims, 1 Drawing Sheet

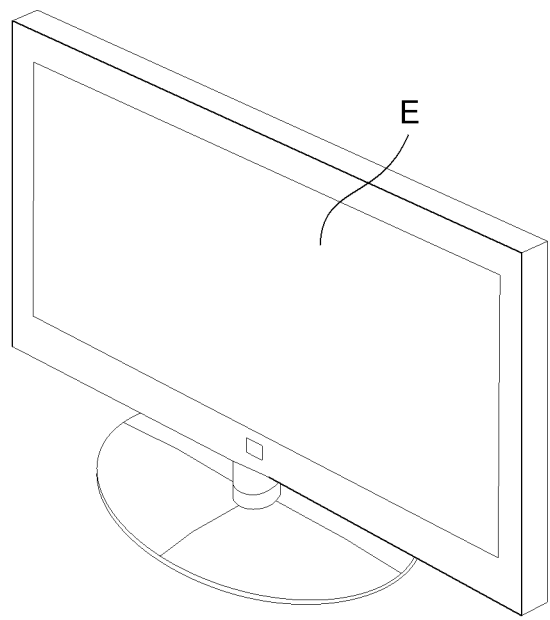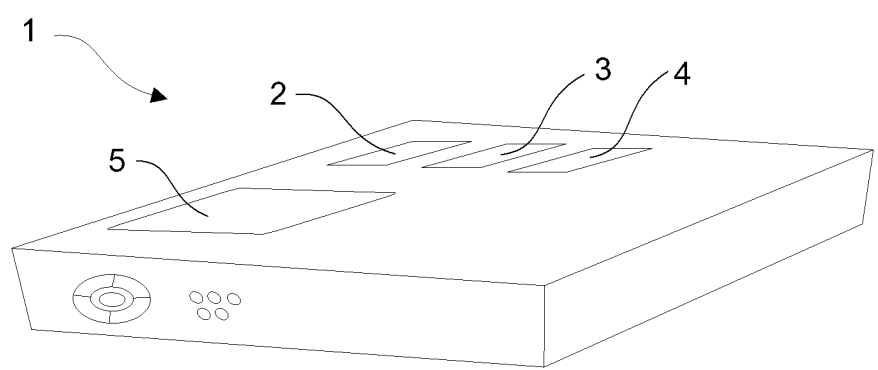

DIGITAL BROADCAST RECEIVING DEVICE HAVING AN ELECTRONIC PROGRAM GUIDE

The present invention relates to storing and displaying the electronic program guide (EPG) data in a digital broadcast receiving device.

EPG is the system which is used in digital broadcast receiving devices such as satellite receiver, television or radio for displaying the data about the channel that is currently being watched or listened to, or the current data about the other broadcasts or the data relating to the next programs. Data about the programs such as the program title, the broadcast time and/or the broadcast duration are included in EPG.

In the state of the art, the EPG data are stored in the event information table (EIT) in the storage means of the digital broadcast receiving device. In the state of the art EPGs, the program data are displayed to the user in a matrix format. The said matrix is arranged similarly to printed program guides such that time is in an axis and channels are in the other axis. Generally, the channel that is currently being watched/listened to is displayed in the first place.

However, as a result of the increase in the number of channels and in the next program data nowadays, the amount of data required to be stored creates a need for a high capacity storage means. However, the space that can be allocated on the nonvolatile and/or volatile storage means for storing the EPG data is limited. Therefore, when the amount of received data exceeds the storage means space allocated for EPG, new data cannot be received and the EPG data relating to some channels and/or programs cannot be stored, and the related cells in the EPG display matrix appear empty when the user enters the EPG menu.

In the state of the art Japanese Patent No. JP4332225 and International Patent Application No WO9641470, a method to be used in a digital broadcast receiving device, developed for the efficient utilization of the storage means space wherein the EPG data are stored and for entirely storing the channel data that are of high priority for the user, and a device operating according to this method are explained. In these embodiments, by means of keeping the EPG data determined to be of high priority in the storage means and erasing the EPG data with low priority by evaluating the past watching preferences of the user and the quality of the EPG data, the program data of the channels that are of high priority for the user are provided to be stored for a long period of time without increasing the storage means space wherein the EPG data are stored.

The aim of the present invention is the realization of a digital broadcast receiving device wherein the storage means space, in which the EPG data are stored, is used efficiently.

In the memory of the control unit used in the digital broadcast receiving device realized in order to attain the aim of the present invention, explicated in the first claim and the respective claims thereof, a channel order wherein the channels are displayed to the user is stored. The control unit first determines a reference channel. Thereafter, the control unit prioritizes the EPG data stored in the storage means according to the distance of the channel, to which the data belong, to the reference channel in the channel order. During the prioritization, a higher prioritization point is assigned to the channels close to the reference channel and a lower prioritization point is assigned to the channels far from the reference channel. According to the result of this prioritization, the control unit keeps the EPG data relating to the channels, the prioritization points of which are higher than a minimum prioritization point stored in the memory thereof, in the storage means and thus, loss of space in the storage means due to storing data related to the channels, the prioritization points of which are low, is prevented.

In different embodiments of the present invention, the reference channel can be determined so as to be the channel that is currently being watched, the channel that is currently selected in the EPG menu or the channel that is currently being watched when the EPG menu is closed and the channel that is currently selected in the EPG menu when the EPG menu is open.

When the reference channel is changed, that is, in the situation that the channel that is currently being watched is changed or when moved back and forth in the channel list in the EPG menu, the prioritization process is repeated and according to the new prioritization points, the unnecessary EPG data in the storage means are erased. In this case, the storage means space required for storing the EPG data related to the channels, the prioritization points of which are increased in the last performed prioritization in comparison to the previous prioritization and hence, the EPG data of which are required to be stored now even though they are not stored in the storage means before, is provided.

In an embodiment of the present invention, when the user opens the EPG menu, the channel which is currently being watched is located in the middle in the EPG matrix displayed on the screen. The other channels are ordered before or after the reference channel according to the channel order stored in the memory of the control unit. In this array, the two channels having the highest priority points are displayed before or after the channel which is currently being watched. Similarly, channels are ordered to the two sides of the channel, which is currently being watched, according to the prioritization points. That is, the channels that are first displayed on the screen are the reference channel and the channel that has the highest priority point. Since the prioritization point is updated as the user proceeds through the channel order in the EPG menu, in fact always the channels having the highest prioritization points and the reference channel are displayed on the screen during usage of the EPG menu.

In an embodiment of the present invention, the minimum prioritization point is determined by the producer and stored in the memory of the control unit during production.

In another embodiment of the present invention, the control card determines the minimum prioritization point according to the size of the EPG data reaching the receiving means and to the occupancy rate of the storage means. In this embodiment, since the storage means will not be too full if the EPG data transmitted to receiver, the receiving means do not contain many details and hence have a small size, the minimum prioritization point is kept low and thus, EPG data relating to more number of channels are provided to be kept in the storage means. However, if the EPG data are too detailed, that is, have a large size, this time the minimum prioritization point is determined higher and EPG data for less number of channels but with more details are kept in the storage means.

In another embodiment of the present invention, the control unit determines the minimum prioritization point stored in the memory thereof such that EPG data for at least one third of all the channels saved in the channel order is kept in the storage means.

In another embodiment of the present invention, the control unit determines the minimum prioritization point stored in the memory thereof such that EPG data for at least the number of channels that can be displayed on the screen (E) at the same time are always kept in the storage means.

The digital broadcast receiving device realized in order to attain the aim of the present invention is illustrated in the attached figures, where:

FIG. 1—is the schematic view of a digital broadcast receiving device and a display device.

The elements illustrated in the figures are numbered as follows:

1. Digital broadcast receiving device
2. Receiving means
3. Storage means
4. Transmitting means
5. Control unit The digital broadcast receiving device (1) of the present invention comprises at least one receiving means (2) which provides the EPG data to be received, at least one storage means (3) which provides the EPG data to be stored, at least one transmitting means (4) which transmits data to a screen (E) so as the EPG data are able to be viewed by the user, and a control unit (5)

in the memory of which a channel order wherein the channels (C1, C2, C3, . . . ) are displayed to the user is stored, which determines a reference channel (Cref), which prioritizes the EPG data related to each channel (C1, C2, C3, . . . ) according to the proximity to the reference channel (Cref) in the channel order such that the highest prioritization point (PP) is given to the closest channel, which keeps only the EPG data relating to the channels, the prioritization points (PP) of which are higher than a minimum prioritization point (PPmin) stored in the memory thereof, in the storage means (3).

Thus, space is opened up in the storage means (3) for completely storing the new received EPG data relating to the channels, the prioritization points (PP) of which are above the minimum prioritization point (PPmin), that is, which are in the closest position to the reference channel (Cref) in the channel order.

In an embodiment of the present invention, the reference channel (Cref) is determined as the channel which is currently being watched.

In another embodiment of the present invention, the reference channel (Cref) is determined as the channel which is currently selected in the EPG menu.

In another embodiment of the present invention, the reference channel (Cref) is determined as the channel that is currently being watched when the EPG menu is closed and as the channel that is currently selected in the EPG menu when the EPG menu is open.

In the digital broadcast receiving device (1), when the user opens the EPG menu, the channel which is currently being watched (Cref) is preferably located at the middle point of the rows or columns, wherein channels are displayed, in the EPG matrix displayed on the screen (E). Thus, the channels which are located before or after the channel, that is currently being watched (Cref), in the channel order and the EPG data of which are completely stored in the storage means (3) are displayed on the screen (E) in the first place.

When the user changes the reference channel (Cref), that is, when the user changes the channel that is currently being watched while EPG is closed or moves between the channels on the EPG matrix in the EPG menu, the control unit (5) instantaneously updates the prioritization point (PP) of the EPG data relating to each channel (C1, C2, C3, . . . ). Thus, when the EPG menu is opened, the EPG data relating to all of the channels that are displayed on the screen (E) are provided to be kept always in the storage means (3).

In an embodiment of the present invention, a minimum prioritization point (PPmin) which is determined by the producer is stored in the control unit (5) memory.

In another embodiment of the present invention, the minimum prioritization point (PPmin) is determined by the control unit (5) instantaneously according to the occupancy rate of the storage means (3).

In another embodiment of the present invention, the minimum prioritization point (PPmin) stored in the control unit (5) memory is determined by the control unit (5) such that EPG data for at least one third of all the channels saved in the channel order are kept in the storage means (3).

In yet another embodiment of the present invention, the minimum prioritization point (PPmin) stored in the control unit (5) memory is determined by the control unit (5) such that EPG data for at least the number of channels that can be displayed on the screen (E) at the same time are always kept in the storage means (3).

By means of the present invention, a prioritization is performed in the EPG data stored in the storage means (3) and thus, storing the EPG data, which possible to be viewed by the user within the shortest time, in the storage means (3) and supplying the EPG data, which is to be reached by the user later when needed, are provided. Consequently, the user can consistently reach the complete EPG data.

The EPG data storing method which is possessed by the digital broadcast receiving device (1) of the present invention, and which is executed by the control unit (5) in the memory of which a channel order wherein the channels are displayed to the user is stored comprises the following steps:

determining a reference channel (Cref), prioritizing the EPG data related to each channel (C1, C2, C3, . . . ) according to the proximity to the reference channel (Cref) in the channel order such that the highest prioritization point (PP) is given to the closest channel, keeping only the EPG data relating to the channels, the prioritization points (PP) of which are higher than a minimum prioritization point (PPmin) stored in the memory of the control unit (5), in the storage means (3).

It is to be understood that the present invention is not limited by the embodiments disclosed above and a person skilled in the art can easily introduce different embodiments. These should be considered within the scope of the protection postulated by the claims of the present invention.

The invention claimed is:

1. A digital broadcast receiving device comprising at least one receiving means which provides the EPG data to be received, at least one storage means which provides the EPG data to be stored, at least one transmitting means which transmits data to a screen such that the EPG data are able to be viewed by a user and a control unit having a memory of which a channel order wherein the channels are displayed to the user is stored, wherein the control unit determines a reference channel by setting the reference channel to be a channel that is currently being watched when EPG menu is closed and a channel that is currently selected in the EPG menu when the EPG menu is open, prioritizes the EPG data related to each channel according to the proximity to the reference channel in the channel order such that the highest prioritization point is given to the closest channel to the reference channel in the channel order, and keeps only the EPG data relating to the channels, the prioritization points of which are higher than a minimum prioritization point stored in the memory thereof, in the storage means.

2. The digital broadcast receiving device as in claim 1, wherein the control unit provides the channel that is currently being watched to be located at the middle point of the rows or columns wherein channels are displayed in the EPG matrix displayed on the screen when the user opens the EPG menu.

3. The digital broadcast receiving device as in claims 1 or 2, wherein the control unit repeats the prioritization process when the reference channel is changed.

4. The digital broadcast receiving device as in claims 1 or 2, wherein the control unit, in the memory of which the minimum prioritization point determined by the producer is stored.

5. The digital broadcast receiving device as in claims 1 or 2, wherein the control unit instantaneously determines the minimum prioritization point according to the occupancy rate of the storage means and stores it in the memory thereof.

6. The digital broadcast receiving device in claims 1 or 2, wherein the control unit determines the minimum prioritization point such that EPG data for at least one third of all the channels saved in the channel order are kept in the storage means and stores it in the memory thereof.

7. The digital broadcast receiving device as in claims 1 or 2, wherein the control unit determines the minimum prioritization point such that EPG data for at least the number of channels that can be displayed on the screen at the same time are always kept in the storage means and stores it in the memory thereof.

8. An EPG data storing method for a digital broadcast receiving device comprising at least one receiving mean which provides the EPG data to be received, at least one storage means which provides the EPG data to be stored, at least one transmitting means which transmits data to a screen such that the EPG data are able to be viewed by a user and a control unit having a memory of which a channel order wherein the channels are displayed to the user is stored, wherein the control unit determines a reference channel by setting the reference channel to be a channel that is currently being watched when EPG menu is closed and a channel that is currently selected in the EPG menu when the EPG menu is open, prioritizes the EPG data related to each channel according to the proximity to the reference channel in the channel order such that the highest prioritization point is given to the closest channel, and keeps only the EPG data relating to the channels, the prioritization points of which are higher than a minimum prioritization point stored in the memory thereof, in the storage means, comprising the steps of:

determining a reference channel, instantaneously prioritizing the EPG data related to each channel according to the proximity to the reference channel in the channel order such that the highest prioritization point is given to the closest channel, and keeping only the EPG data relating to the channels, the prioritization points of which are higher than a minimum prioritization point stored in the memory the control unit, in the storage means.

9. The digital broadcast receiving device as in claim 1, wherein the control unit erases previously stored EPG data relating to channels with prioritization points determined based on a previous reference channel.

* * * * *